United States Patent
Bleckmann et al.

(10) Patent No.: US 6,215,297 B1
(45) Date of Patent: Apr. 10, 2001

(54) ACTIVE MOTION SENSOR HAVING AIR GAP CHECKING FUNCTION

(75) Inventors: Hans-Wilhelm Bleckmann, Bad Nauheim; Heinz Loreck, Idstein; Peter Lohberg, Friedrichsdorf, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/809,811

(22) PCT Filed: Sep. 19, 1995

(86) PCT No.: PCT/EP95/03680

§ 371 Date: May 15, 1997

§ 102(e) Date: May 15, 1997

(87) PCT Pub. No.: WO96/10752

PCT Pub. Date: Apr. 11, 1996

(30) Foreign Application Priority Data

Sep. 30, 1994 (DE) ................................. 44 34 978

(51) Int. Cl.$^7$ ...................................... G01P 21/02
(52) U.S. Cl. ................ 324/166; 324/207.12; 324/207.25
(58) Field of Search .............................. 324/207.12, 166, 324/173, 174, 207.24, 207.25, 225

(56) References Cited

U.S. PATENT DOCUMENTS

| | | |
|---|---|---|
| 4,902,970 | 2/1990 | Suquet . |
| 5,231,351 | * 7/1993 | Kordts et al. .................... 324/207.12 |
| 5,451,867 | * 9/1995 | Loreck et al. ........................ 324/166 |
| 5,998,989 | 12/1999 | Lohberg ................................ 324/174 |

FOREIGN PATENT DOCUMENTS

| | | |
|---|---|---|
| 2235056 | 7/1972 | (DE) . |
| 2405416 | 9/1974 | (DE) . |
| 3226073 | 4/1983 | (DE) . |
| 3433777 | 3/1986 | (DE) . |
| 39 41 473 A1 | 12/1989 | (DE) . |
| 4131128 | 9/1991 | (DE) . |
| 4228888 | 3/1994 | (DE) . |
| 0046006 | 2/1982 | (EP) . |

OTHER PUBLICATIONS

Klaus Fischer: "Drehzahlerfassung mit Differenz–Hall–IC", Electronik Apr. 1991, p 86, 95–97. (English translation also provided).

"The Magnetoresistive Sensor" published by Philips Export B.V. on Jun. 20, 1988, p. 1–19.

Article "Automatic Testing of Sensors in ABS Systems"; Technisches Messen 58(1991) 7/8.

Articles "Drehzahlerfassung mit Differenz–Hall–IC"; Elektronik Apr. 1991. (No Translation).

* cited by examiner

*Primary Examiner*—Walter E. Snow
(74) *Attorney, Agent, or Firm*—Rader, Fishman & Grauer PLLC

(57) ABSTRACT

In so-called active sensors which transmit an output signal to an electronic controller, the amplitude of the output signal depending neither on the speed of the encoder nor on the distance between the sensor and the encoder, the problem is that the output signal does not permit identifying whether the air slot size set between the sensor and the encoder is chosen sufficiently small to ensure an appropriate amplitude of the input signal, generated in the sensor, even when dynamic increases in the air slot occur. If the input signal induced by the encoder in the sensor is too low, a sensor-inherent hysteresis threshold is not exceeded, and no output signal is generated. To prevent the sensor from being inadvertently operated at the limits of its maximum permissible air slot, according to the present invention, the sensor-inherent hysteresis threshold is changed over to the higher hysteresis threshold for testing purposes. If a sufficient input signal is generated even by way of this higher hysteresis, it may be supposed that the sensor is correctly mounted.

7 Claims, 1 Drawing Sheet

ACTIVE MOTION SENSOR HAVING AIR GAP CHECKING FUNCTION

TECHNICAL FIELD

The present invention relates to sensor elements for determining displacements, motional speeds, and rotational speeds in the field of mechanical engineering, in particular in the automotive vehicle industry and more particularly in the range of application of controlled brakes, for determining the rotational speeds of wheels.

BACKGROUND OF THE INVENTION

Sensor devices for determining the rotational speeds of wheels are known. Normally, the devices include an incremental encoder which is mechanically coupled to the rotating part, and a sensor which scans the encoder in a non-contact manner. Ferromagnetic toothed wheels or ferromagnetic discs are used as encoders. When sensors are used in wheel bearings, it is customary to employ magnetized structures, for example, an annular or circular arrangement of adjacent north and south poles, embedded in a mechanical carrier.

It is most common to use so-called "passive" sensors according to the reluctance principle. The sensors include a combination of a copper coil with a permanent magnet which is magnetically coupled to the encoder. The encoder modulates the magnetic coupling reluctance synchronously with movement. An alternating voltage, synchronous with movement, is induced in the copper coil in the way of a dynamo, and the frequency of the alternating voltage is evaluated as a measured quantity. The induced signal voltage fades away during standstill and will possibly adopt undesirably high values at high speeds.

To avoid such high voltages so-called "active" sensors, have been provided. Sensors of this type are described in German patent application No. 41 35 789, for example. The sensors are a combination of a magnetostatically sensitive element and a permanent magnet which is magnetically coupled to the encoder. In this arrangement also, the encoder modulates the magnetic coupling reluctance or, in the case of the magnetized encoder, the field direction, synchronously with movement. The sensor element responds to the variations of the flux density or to the movement of a field vector. Examples in the art of such basic elements are Hall probes or magneto-resistive permalloy structures. The signal amplitude of active sensors of this type is independent of the speed of the encoder. Active sensors require for operation an electric energy which is supplied by an electronic controller. Technical methods involving a three-conductor feed-in or a two-conductor feed-in are known in the art. The three-conductor version supplies a signal voltage to the input of the electronic controller, while the two-conductor version furnishes a signal current.

Active sensors of the current type, limit the sensor information available to them to one single parameter, the signal frequency. An internal amplifier trigger circuit generates a binary output signal with two constant amplitude values in the area of a defined, permissible air slot between the sensor and encoder, irrespective of the size of the air slot. The change in flanks of the amplitude values is evaluated, but the signal itself does not indicate the changed values. However, the signal discontinues abruptly when the permissible air slot size is exceeded because in this event the induced sinusoidal input signal falls short of a sensor-inherent hysteresis threshold, and the sensor stops responding.

A device for the adjustment of the air slot size, as disclosed in German patent application No. 40 33 064, ensures a proper mounting position of the sensor and maintains the permissible air slot size. The sensor is fitted in a sleeve-shaped mounting support and is urged by a compression spring with a flange against a corresponding flange of the mounting support in the direction of the encoder. The flange of the sensor includes a plurality of similar, axial teeth, while the flange of the mounting support includes two groups of axial indentations, the number of which corresponds to the number of teeth. When the sensor is installed, its teeth are placed in the group of the deep indentations, and the assembly of the mounting support is so that the sensor is initially in contact with the encoder. Subsequently, the teeth are locked in the group of the flat indentations so that a defined size of the air slot between the sensor and encoder is adjusted. The correct mounting position cannot be verified after the assembly is completed.

When an active sensor, due to misassembly, is inadvertently operated at the limits of its maximum permissible air slot, an appropriately great dynamic deformation of the kinematics between the sensor and encoder will possibly increase the air slot so that the permissible air slot size is exceeded and the output signal is interrupted.

Therefore, an object of the present invention is to render testing of the size of the air slot possible even after the assembly of the sensor.

It may be determined by change-over from a first to a second hysteresis threshold, which is higher than the first hysteresis threshold, whether the input signals are sufficient to overcome even a high hysteresis threshold. When the generation of output signals continues even after change-over to the second hysteresis threshold, it may be assumed that proper operation of the sensor is ensured even when taking into account dynamic axial deformations which increase the air slot.

Various provisions are possible as means of actuating a hysteresis change-over of this type. When the change-over is triggered by an increase in the operating voltage of the sensor, no special software arrangements in the controller or in a maintenance apparatus are required. This is advantageous especially when the testing of the air slot size shall be carried out only during maintenance of a vehicle.

If the electronic controller is preferred to perform testing of the air slot size automatically, it is advisable to actuate the sensor by serial bit configuration voltages because this way excessively increased supply voltages are not necessary, not even during testing cycles as mentioned above.

In a particularly simple manner, resetting to the first hysteresis threshold, which permits the sensor to sense the motion, is achieved by the sensor switching back automatically. This may occur after a defined period of time which is sufficient to test the air slot size, or instantaneously after interruption of a signal which causes change-over to the second hysteresis threshold. For safety reasons, resetting is provided also when the encoder reaches a predetermined speed.

The idea of the present invention will be explained in detail in the following, making reference to two two-part Figures of the accompanying drawing.

DETAILED DESCRIPTION OF THE PREFERRED EMBODIMENTS

Figure 1:
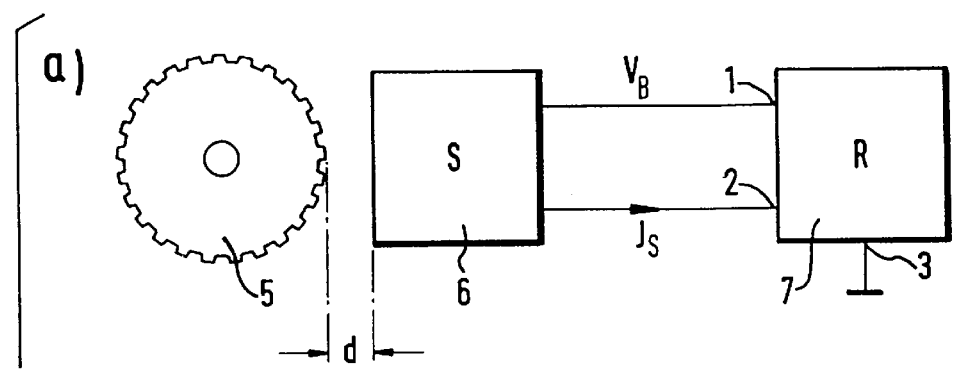
FIG. 1 is a view of an arrangement including encoder, sensor and controller, and a diagram showing the time variation of the output signal sent to the electronic controller.
Figure 1:
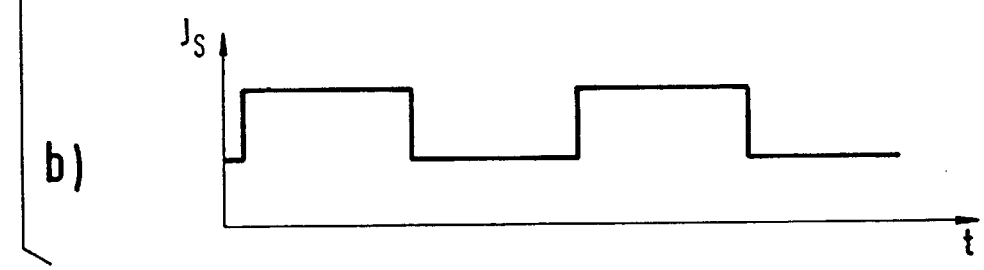

FIG. 1a shows the arrangement of an active sensor 6 connected to an electronic controller 7 by a two-wire connection. Sensor 6 is supplied as measured between a controller 7 with the operating voltage $V_B$ pin 1 and pin 3 and returns a signal current $I_S$ to the controller by way of pin 2.

Reference numeral 'd' refers to the size of the air slot between the sensor 6 and an encoder 5. For the sake of simplicity, the encoder 5 is shown as a toothed wheel. However, the encoder can also be formed by adjacent magnetic north and south poles. The air slot size 'd' dictates whether a signal current $J_S$ according to FIG. 1b is produced. The curve of the signal current $J_S$, which is sent as an output signal from the sensor 6 to the controller 7, has a square wave shape. Change-over between the different levels occurs always when an input signal, induced in the sensor 6 the encoder 5, exceeds a predefined hysteresis threshold. When the hysteresis threshold is not exceeded, there will be no change-over between the different levels of the signal current $I_S$. Thus, it is impossible to derive any information about the speed of the encoder 5. This is the case whenever the air slot size 'd' is so large that no sufficient input signal is produced. But even if a sufficient input signal is generated, a dynamic deformation may induce the air slot size 'd' to exceed a permissible value at least temporarily, thereby preventing a sufficient input signal. However, this condition cannot be detected by the signal height of the output signal in the shape of the signal current $I_S$.

Figure 2:
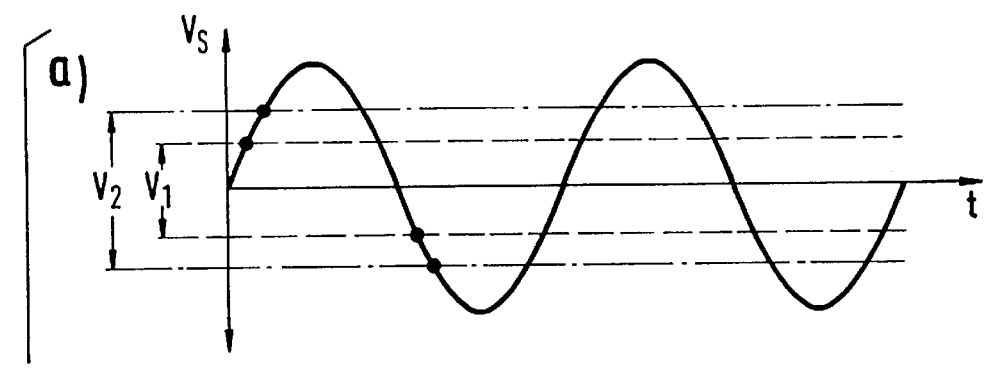
FIG. 2 shows one chart each with a sufficiently high and with an insufficient input signal.
Figure 2:
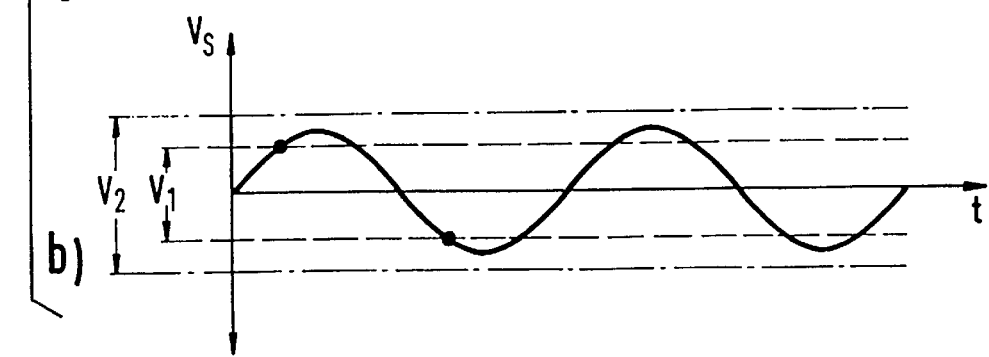

Therefore, FIG. 2 arranges for a change-over of the hysteresis threshold. The maximum permissible air slot size 'd' is a function of the sensor-inherent hysteresis voltage. In the operation for the speed determination of the encoder 5, the sensor 6 has a first hysteresis threshold, i.e. the operating hysteresis voltage $V_1$. To make sure that the input signal, i.e. the signal voltage $V_S$, is sufficiently high to provide information about the encoder speed even in the event of increased air slot sizes 'd' which are due to dynamic deformations, the sensor 6 is temporarily changed over to a second hysteresis threshold, i.e. the test hysteresis voltage $V_2$.

In the embodiments of FIG. 2a and FIG. 2b, the signal voltage $V_S$ exceeds the first hysteresis threshold, i.e., the operating hysteresis voltage $V_1$ so that a signal current $I_S$ is produced in both cases. However, it shows in a change-over to the test hysteresis voltage $V_2$ that no output signal can be derived with a signal voltage $V_S$ of FIG. 2b. The points of intersection with the plotted threshold values of the test hysteresis voltage $V_2$ are missing. That means, the second hysteresis threshold is not exceeded, allowing the conclusion that the air slot size has too little reserves to ensure an output signal even in the case of a dynamic deformation. In contrast thereto, the signal voltage $V_S$ is of a sufficient amount in FIG. 2a. Even after change-over to the test hysteresis voltage $V_2$, it can be seen from the points of intersections with the second hysteresis threshold that the sensor 6 and encoder 5 are arranged sufficiently closely adjacent each other to guarantee an output signal in the form of the signal current $I_S$ even in the presence of deformations.

The ratio between the operating hysteresis voltage $V_1$ and the test hysteresis voltage $V_2$ is defined by the degree of the dynamic deformation to be expected and the associated increase in the air slot size 'd'. The ratio amounts to roughly 0.7 in this case.

The hysteresis change-over actions can be controlled electronically by way of the connecting lines to the sensor 6. In this example, control is possible by way of one or both of the connecting lines between the sensor 6 and controller 7. Methods of implementing this procedure are known from the telephone exchange technology, the data-bus technology and the activation of bus participants by way of serial interfaces. For example, the operating voltage $V_b$ may be exceeded by its multiple for a brief interval to trigger a change-over action from the operating hysteresis voltage $V_1$ to the test hysteresis voltage $V_2$ After a limited time, $V_2$ will automatically return to $V_1$. However, it is also possible to drive one or both of the connecting lines to the sensor 6 by serial bit configuration voltages to perform the change-over between the operating hysteresis voltage and the test hysteresis voltage. Return to the operating hysteresis voltage $V_1$ may then be effected when the actuating signals are removed. Further, such testing cycles will always be discontinued when the encoder 5 exceeds a predetermined rotational speed so that the actual purpose of the sensor 6 is not impaired by the increased test hysteresis voltage $V_2$. The control may be effected either by the controller 7 or by any separate testing apparatus.

What is claimed is:

1. An active sensor system for determining a displacement, motional speed, or rotational speed of an encoder, comprising:

a sensor for generating an input signal induced by the encoder, the input signal having an amplitude corresponding to an air slot size between the encoder and the sensor, wherein the sensor selects a threshold selection to check whether the input signal amplitude crosses at least one of a first hysteresis threshold and a second hysteresis threshold and transmits an output signal having an amplitude that is independent of speed;

an electronic controller coupled to said output signals of said sensor, wherein said electronic controller supplies the sensor with an operating voltage; and means for changing said sensor threshold selection from one of said first and second hysteresis thresholds to the other of said first and second hysteresis thresholds.

2. The active sensor system as claimed in claim 1, wherein said changing means is implemented by altering an operating voltage supplied to said sensor by said electronic controller.

3. The active sensor system as claimed in claim 1, wherein said changing means is implemented by altering serial bit configuration voltages supplied to said sensor by said electronic controller.

4. The active sensor system as claimed in claim 1, wherein said changing means automatically switches the sensor threshold selection from one of said first and second hysteresis thresholds to the other of said first and second hysteresis thresholds.

5. The active sensor system as claimed in claim 4, wherein the sensor threshold selection is automatically switched after a defined period of time following the change-over.

6. The active sensor system as claimed in claim 4, wherein the sensor threshold selection is automatically switched in the absence of change-over signals.

7. The active sensor system as claimed in claim 4, wherein the sensor threshold selection is automatically switched when a defined speed of the encoder is reached.

* * * * *